J. J. & C. C. HRUBY.
RIM FOR AUTOMOBILE TIRES.
APPLICATION FILED DEC. 4, 1916.
1,291,896.
Patented Jan. 21, 1919.
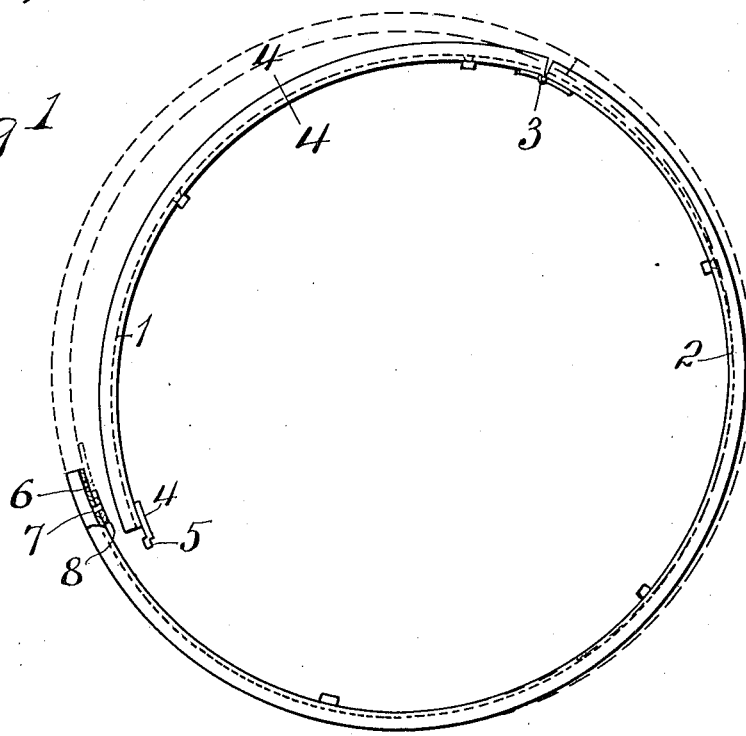
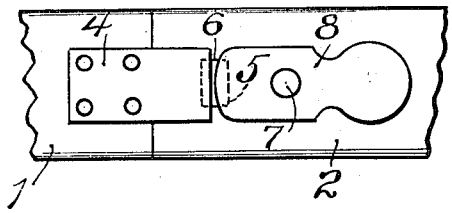
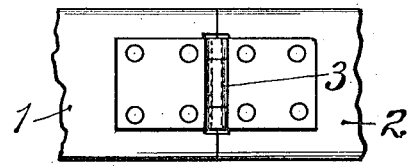
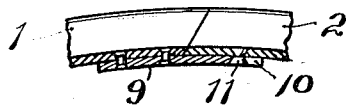
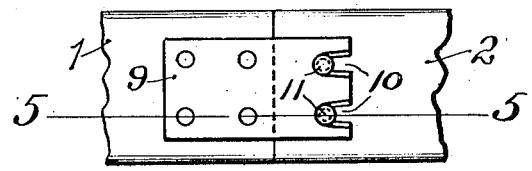
WITNESS:
R. E. Hamilton
Joseph J. Hruby  INVENTORS
Charles C. Hruby
By Warren D. Stouse
Their ATTORNEY

UNITED STATES PATENT OFFICE.

JOSEPH J. HRUBY AND CHARLES C. HRUBY, OF ST. JOSEPH, MISSOURI.

RIM FOR AUTOMOBILE-TIRES.

1,291,896.  Specification of Letters Patent.  Patented Jan. 21, 1919.

Application filed December 4, 1916. Serial No. 135,064.

*To all whom it may concern:*

Be it known that we, JOSEPH J. HRUBY and CHARLES C. HRUBY, citizens of the United States, residing at St. Joseph, in the county of Buchanan and State of Missouri, have invented a certain new and useful Improvement in Rims for Automobile-Tires, of which the following is a specification.

Our invention relates to improvements in rims for automobile tires.

The object of our invention is to provide a rim which may be quickly and easily applied to or detached from an ordinary automobile tire. Rims have been provided and are largely used which are transversely divided at one point. Considerable difficulty is experienced in springing such rims into form for insertion within or removal from the tire.

In our improved construction, the rim is transversely divided at two points, that is, it is composed of two segmental members adapted to be disposed end to end so as to form a circle, and preferably, but not necessarily, having one set of ends hinged together, so that the members may be easily swung to and from their operative position.

The novel features of our invention are hereinafter fully described and claimed.

In the accompanying drawing, which illustrates our invention,

Figure 1 is a side view of our improved rim, shown in dotted lines, expanded to its operative position, and shown in solid lines contracted.

Fig. 2 is an enlarged inside view of the free ends of the segmental members, shown releasably secured together.

Fig. 3 is an inside view, enlarged, of the hinged ends of the segmental members.

Fig. 4 is an enlarged cross section on the line 4—4 of Fig. 1.

Fig. 5 is a longitudinal sectional view on the line 5—5 of Fig. 6.

Fig. 6 is an inside view of a modification of our invention, showing two segmental members slidably interlocked instead of being hinged together.

Similar reference characters designate similar parts in the different views.

Referring first to the preferred form of our invention, shown in Figs. 1 to 4, 1 and 2 respectively designate two arcuate segmental rim members flexibly connected together at one set of ends by a hinge 3, the two members of which are respectively rigidly secured to the inner sides of the members 1 and 2, whereby the members 1 and 2 may be swung from the circular operative position shown in dotted lines in Fig. 1, to the contracted position shown in solid lines in said figure.

Any suitable means may be provided for releasably securing together the free set of ends of the two rim members. In the drawing is illustrated a mechanism for effecting this function comprising the following described parts.

Secured to the inner side and free end of the member 1 is a plate 4, which projects beyond the adjacent end of said member, the projecting portion being provided with an off-set lug 5 which is adapted to enter a transverse hole 6 provided in the adjacent free end of the member 2.

Pivoted to the inner side of the member 2 by a rivet 7 is a turn button 8 which is adapted to be turned to and from a position in which it will lie at the inner side of the lug 5, when the latter is in the hole 6, as shown in Fig. 2. In this position, the turn button 8 will releasably hold the free ends of the segmental members in their connected operative position.

For removal of the rim from the tire, the turn button 8 is turned at right angles to the position shown in Fig. 2, upon which the member 1 may be swung inwardly on the hinge 3 from the position shown in dotted lines to the released position shown in solid lines in Fig. 1. The member 2 is preferably resilient, so that upon the inward swinging of the free end of the member 1, the member 2 will contract so as to have a smaller radius in its normal released position than the radius of the circle which is formed by the two members 1 and 2, when in their operative position.

When in their contracted position, the segmental rim members 1 and 2 may be easily removed from or inserted into a tire.

Upon inserting the rim into a tire, they are placed therein in their contracted form, following which the member 1 is swung outwardly on the hinge 3, and the members are expanded until their free ends abut against each other and the lug 5 is in the hole 6. The button 8 is then turned to the longitudinal position shown in Fig. 2, thereby releasably locking the members together.

In the modified form shown in Figs. 5 and 6, a plate 9 is secured to the inner side of the member 1 and has one end projecting outwardly beyond the adjacent end of said member, so as to underlap the adjacent end of the segmental rim member 2, as shown in Fig. 6.

The projecting end of the plate 9 is provided with one of more notches 10 respectively adapted to receive the inner ends of two rivets 11, which are secured to and extend inwardly from the inner side of the member 2. Said rivets 11 at their inner ends are provided with heads adapted to respectively engage the beveled inner edges of the notches 10.

The opposite ends of the members 1 and 2 may be provided with any suitable connecting means as, for example, such as has already been described.

To detach the ends of the members 1 and 2, which are connected by the plate 9, the free ends are first released in the manner already described, that is by releasing the button 8, when such locking means is provided, and then springing the released end of the member 1 inwardly so as to clear the member 2 and button 8, after which the member 1 may be moved longitudinally so as to slide the plate 9 from engagement with the rivets 11, whereby the members 1 and 2 may be detached from each other and from the tire.

We do not limit our invention to the structures shown and described, as modifications, within the scope of the appended claim, may be made without departing from the spirit of our invention.

What we claim is:

A rim for automobile tires, comprising two segmental members, one of which is resilient, having one set of ends hinged together and adapted to form a circle, the resilient member when not expanded to form a circle, having a radius less than the radius of the circle, and a turn button pivoted to the inner side of one of said members and adapted to be swung thereon to and from a position in which it will engage and hold the other member from inwardly swinging and in such position being held from turning from such position by the constant inward pressure of the resilient member therethrough against the other member.

In testimony whereof we have signed our names to this specification.

JOSEPH J. HRUBY.
CHARLES C. HRUBY.